(No Model.)
R. R. COURSEN.
SAW TOOTHING MACHINE.
No. 567,295.　　　　　　　　　Patented Sept. 8, 1896.
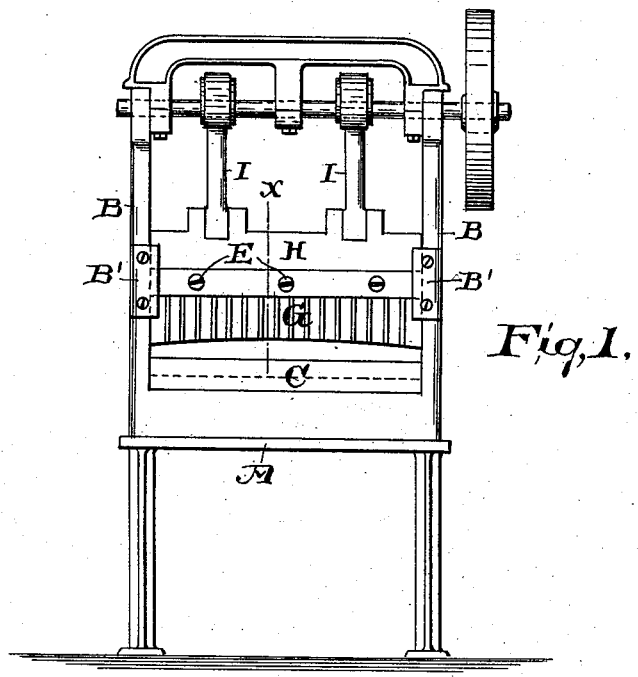
Fig. 1.
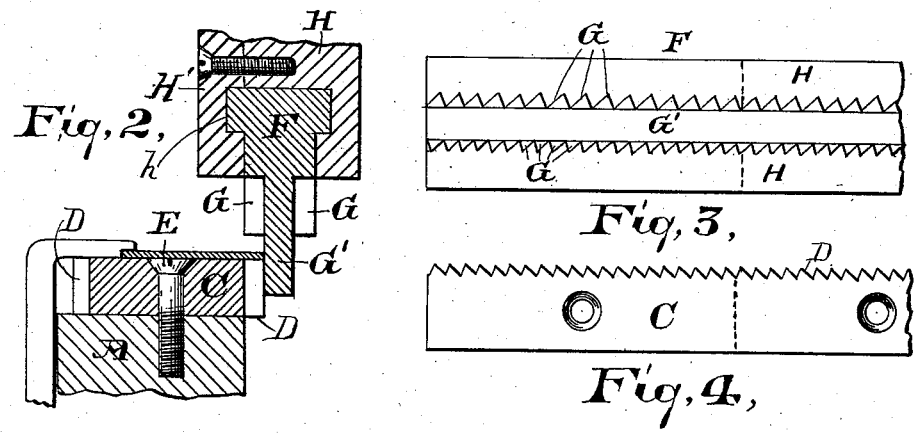
Fig. 2.　　Fig. 3.
Fig. 4.
Witnesses　　　　　　　　　　　Inventor
Robert Sollberger　　　　Robert R. Coursen,
Beatrice Charles.
　　　　　　　　　　　By Drake & Co., Atty's

UNITED STATES PATENT OFFICE.

ROBERT R. COURSEN, OF NEWARK, NEW JERSEY.

SAW-TOOTHING MACHINE.

SPECIFICATION forming part of Letters Patent No. 567,295, dated September 8, 1896.

Application filed May 31, 1895. Serial No. 551,235. (No model.)

*To all whom it may concern:*

Be it known that I, ROBERT R. COURSEN, a citizen of the United States, residing at Newark, in the county of Essex and State of New Jersey, have invented certain new and useful Improvements in Saw-Toothing Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to form the teeth throughout the length of the saw simultaneously, or in one operation, and thus to save time and expense, and to secure other advantages hereinafter referred to.

The invention consists in the improved saw-toothing machine and in the arrangement and combination of the parts thereof, as hereinafter set forth, and finally pointed out in the claims.

Referring to the accompanying drawings, Figure 1 represents in front elevation a saw-tooth-forming machine embodying my improvements. Fig. 2 is a section through line $x$ of Fig. 1, enlarged and showing a saw in position ready to receive the pressure of the tooth-cutter. Fig. 3 is a bottom edge view of the tooth-cutter broken off. Fig. 4 is a plan view of the anvil or rest upon which the saw lies.

In carrying out my invention I construct a substantial iron frame A B, in which the working parts of the machine are mounted. I also provide a bed-plate or anvil C, having recesses D formed on one edge thereof, conforming in size and shape to the teeth of the saw to be formed thereon, extending throughout the length of said bed-plate or anvil. If desired, the anvil may be formed in sections, as shown in dotted lines in Fig. 4, the ends of which abut against each other, and both edges of the plate may be provided with recesses, as shown in Fig. 2, instead of only one edge. It will be understood, of course, that when both edges of the anvil are recessed the recesses on one edge differ in size from those on the other, so that the same anvil will answer for the cutting of two different-sized teeth. These anvils are interchangeable and may be removed and replaced by others by backing out the fastening bolts or screws E, as will be understood. The cutters F are of the same length as the anvils, and are provided with a series of teeth G on each side, of different sizes, conforming in size and shape with the anvil in connection with which they are intended to be used, as will be readily understood, and are also interchangeable in the same manner as said anvils. Said cutters are each provided with a T-head, which is secured to carriers H by means of a removable plate H', the inner face of which is provided with a groove $h$ to engage with the head of the cutter. The carriers are provided with crank or cam arms I, which are operated by a crank or cam shaft J, mounted in suitable bearings or boxes near the top of the machine, as will be readily understood upon reference to Fig. 1, the shaft being driven by belt or otherwise. The carrier is arranged to slide in grooves in the uprights B of the frame. It will be seen that the cutters F are provided with a guide G', which projects below the teeth, against which the tooth-edge of the saw is placed, and by forcing the cutters down thereon all the teeth are formed in the one movement. It will also be noticed that the lower edge of the cutters are formed on a curved line, so that the cutters begin their operation at each end and culminate at the center, thereby greatly facilitating the cutting of the teeth and rendering the operation very much easier than if the cutters were formed in a straight line, as will be obvious. The line of the curve, however, may be reversed, if preferred, so as to begin cutting at the center. It will be observed that guides B', which form one wall of the grooves in which the carrier works, are removably secured to the frame to admit of the removal or adjustment of the carrier and cutter-plates, as will be understood.

Having thus described my invention, what I claim, and wish to secure by Letters Patent of the United States, is—

1. In a saw-toothing machine, the combination, with a frame, of an anvil, the edge of which is provided with teeth, a carrier, a cutter carried thereby, the under surface of which is provided with a central guide, and having teeth upon each side of the guide extending only a portion of the depth thereof, and means for moving the carrier and cutter relatively to the anvil, substantially as set forth.

2. In a saw-toothing machine, the combination, with a frame, of an anvil, the edge of which is provided with teeth, a carrier, a T-headed cutter therein, the under surface of which is provided with a guide and teeth upon each side thereof, a removable plate secured to the carrier, the inner surface of which is provided with a groove to engage with the head of the cutter, and means for moving the carrier, substantially as set forth.

In testimony that I claim the foregoing I have hereunto set my hand this 15th day of May, 1895.

ROBERT R. COURSEN.

Witnesses:
    OLIVER DRAKE,
    ROBERT SOLLBERGER.